Patented Oct. 11, 1932

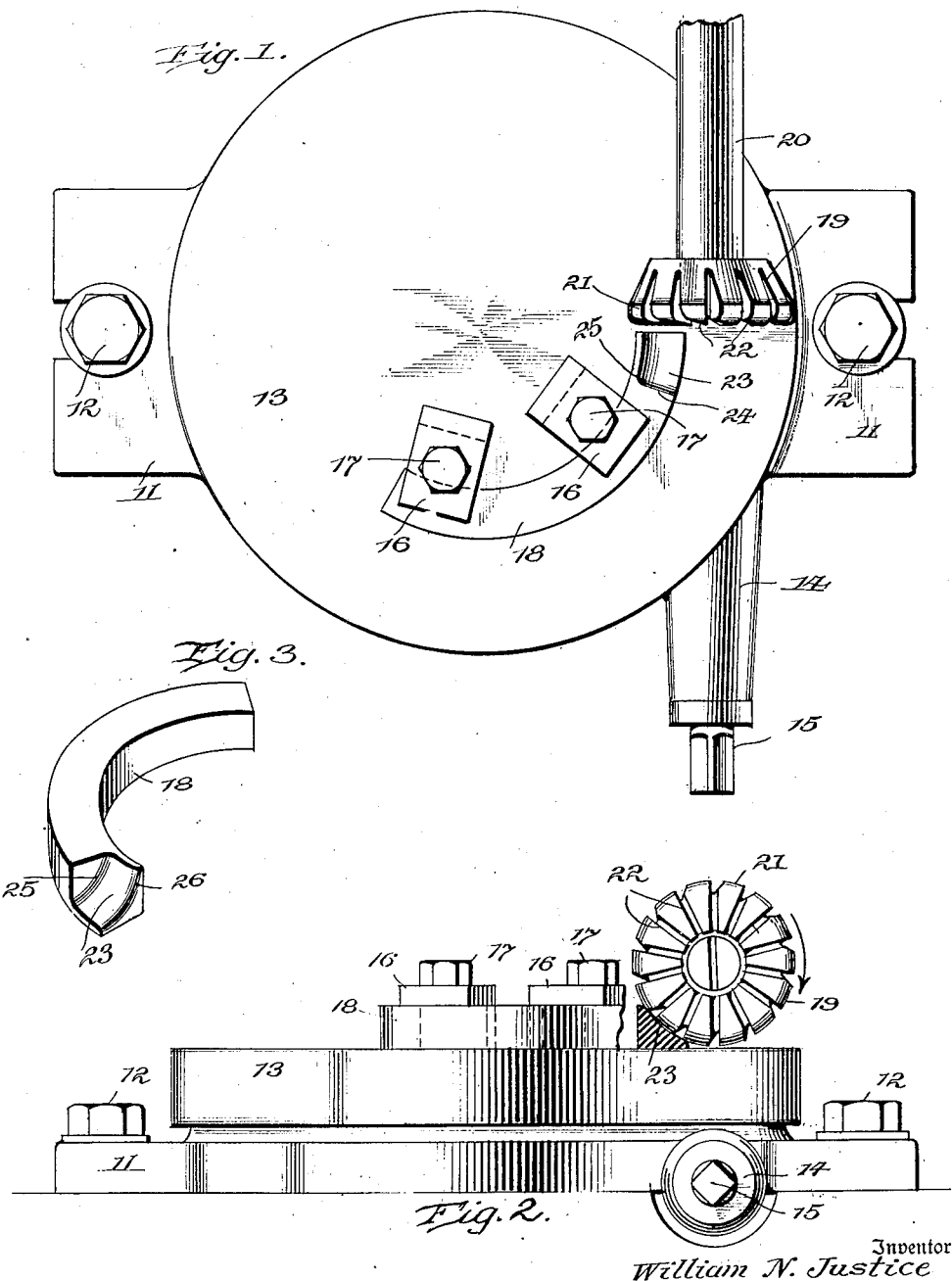

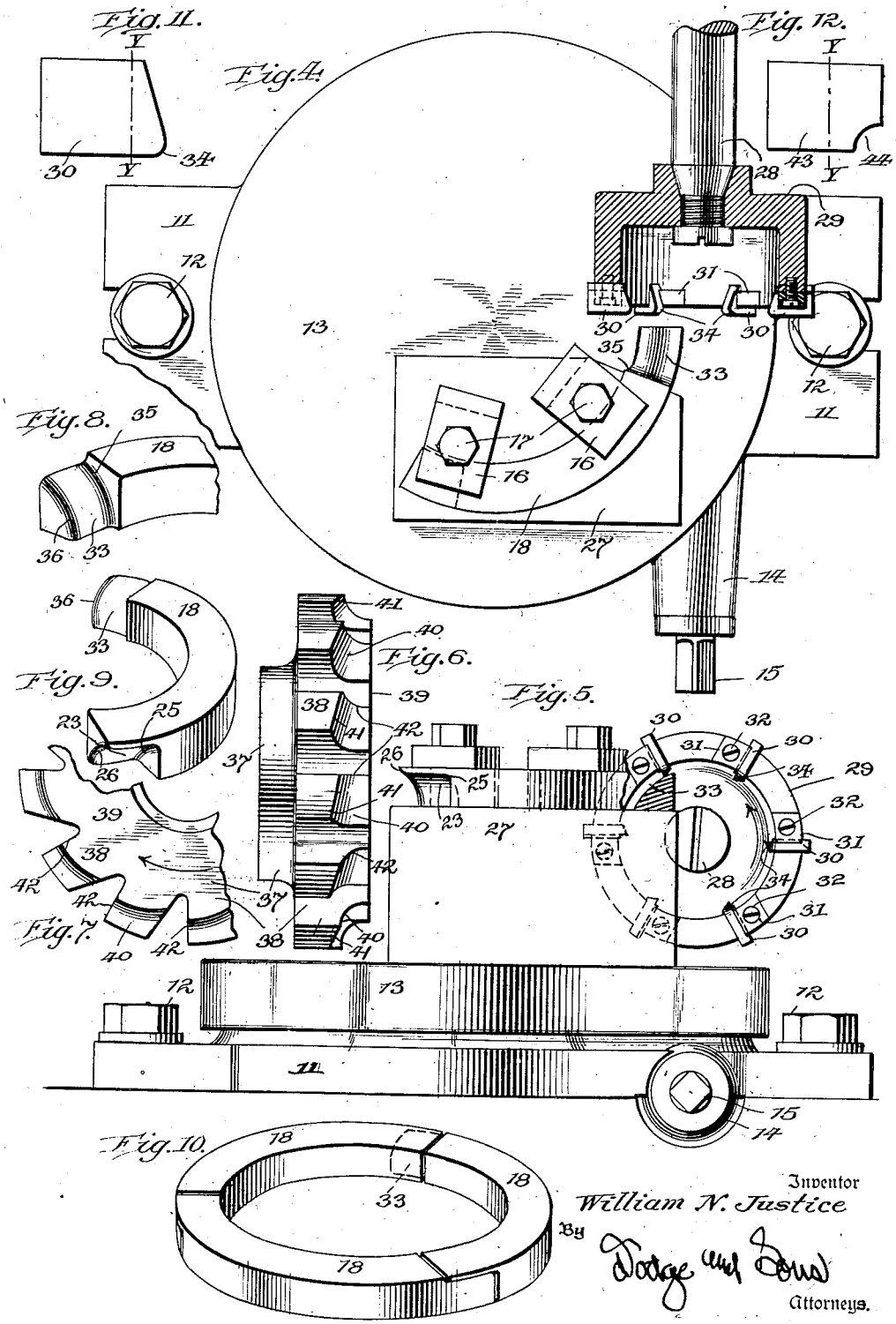

1,881,652

UNITED STATES PATENT OFFICE

WILLIAM N. JUSTICE, OF BALTIMORE, MARYLAND, ASSIGNOR TO THE AMERICAN HAMMERED PISTON RING COMPANY, OF BALTIMORE, MARYLAND, A CORPORATION OF MARYLAND

METHOD OF MAKING A RING JOINT

Application filed May 7, 1931. Serial No. 535,780.

My invention relates to a method of making ring joints and more particularly to a method of producing such joints solely by the use of milling cutters.

In ring joints of the prior art, it has been difficult to produce a structure which would prevent blow-by after the rings became worn. This has been especially true of heavy rings such as are used in Diesel engines, heavy gas engines or in gas compressors wherein there is little lubrication and much foreign material to increase ring wear. Because of this wear, it is necessary that the rings have a very large cross section to increase their life. This increase in size prevents such rings being sprung into the piston grooves, so that for many uses they must be made in segments and provided with auxiliary tension rings.

In joints of the prior art used in segmental rings, the sealing action has been satisfactory during initial installation, but after considerable wear has taken place the joints do not seal properly and frequent replacements are necessary. I have found that joints of the type described and claimed in the patent granted to Allen W. Morton, No. 1,756,905, on April 29, 1930, and assigned to the American Hammered Piston Ring Company, are admirably suited for use in installations of the character where long life without leakage is essential. However, I sometimes prefer to make the contacting surfaces of the joint sections curved so that one is convex and the other concave, as such an arrangement produces a more durable joint. It is also advantageous to have the portions of these cuts adjacent to the ring body filleted so as to strengthen the joints and avoid having an initial line of fracture where the joint section joins the ring.

A ring joint of this character is very satisfactory in operation. While the finished joint appears simple, prior to my invention, expensive and difficult manufacturing operations have been required for the production of satisfactory joints. Accordingly, the main object of my invention is to produce a ring joint having interfitting convex and concave sections solely by the use of milling cutters which can be used with a horizontal milling machine. In this way a very perfect form of joint can be produced accurately, cheaply and quickly.

Broadly considered, my method consists in placing a ring or ring section on the rotatable table of a horizontal milling machine, and bringing it, in succession, into intersecting relation with different styles of milling cutters. By properly adjusting the parts of the apparatus substantially perfectly fitting joints may be produced and the number of manufacturing steps reduced to a minimum.

The details of the invention will appear more fully from the following specification when read in connection with the accompanying drawings, wherein,—

Fig. 1 is a plan view of one form of milling apparatus suitable for use in producing the concave section of a ring joint according to a method embodying my invention;

Fig. 2 is a side view of Fig. 1 with parts broken away to show the relation between the cutting tool and the work;

Fig. 3 is a perspective view of a ring segment having a concave joint section produced by the appartus shown in Figs. 1 and 2;

Fig. 4 is a plan view of the milling apparatus as employed in producing the convex portion of a ring joint, the milling tool being shown partly in section;

Fig. 5 is a side view of Fig. 4 with parts broken away to show the relation between the cutting tool and the work;

Fig. 6 is a side view of another form of milling cutter which may be employed in producing a portion of one of the sections of the joint according to methods embodying my invention;

Fig. 7 is a fragmental face view of the tool looking from the right of Fig. 6;

Fig. 8 is a perspective detail view of a portion of a ring showing the convex section of the joint;

Fig. 9 is a perspective view of a ring segment having joint sections made according to a method embodying my invention;

Fig. 10 is a perspective view of a segmental ring having joints constructed in accordance with my method;

Fig. 11 is a detailed view of one form of cutting tooth employed with the milling tool shown in Figs. 4 and 5; and Fig. 12 is a similar view of a cutting tooth suitable for finishing the convex portion of the joint.

In describing my method of making ring joints, I shall first point out how the concave joint section is produced from a ring blank and then describe the manner of making the convex joint section.

Referring first to Fig. 1, the reference character 11 designates the base or bed of a horizontal milling machine. This bed is secured in position on any suitable frame by bolts 12. Rotatably mounted on the bed 11 is a work table 13 which may be rotated in order to bring the work into contact with appropriate cutting tools. As here shown, the bed 11 carries an extension 14 which acts as a bearing for a suitable adjusting shaft, the free end of which is designated 15. It will be understood that this may be used either as a hand or machine feed and that the details of the construction are not important.

Mounted on the table 13 are a pair of work holders 16 which are adapted to hold the work to the table when clamping means 17 are properly adjusted. In the drawings, a ring segment 18 is shown in adjusted position on the table 13, and in retracted relation with a milling cutter 19 which is adapted to be driven by the milling spindle 20.

For this particular operation, I have found it advantageous to provide the cutter 19 with a series of teeth 21 having cutting edges 22. Accordingly, when the tool 19 is rotating and the table 13 is rotated in a counter clockwise direction, the advancing face of segment 18 contacts with the front face of the tool so that cutting edges 22 bite away the metal to form the concave section 23 of the joint. As the table 13 continues to rotate, the teeth cut deeper and deeper until the joint section takes the form shown in Fig. 1.

During the cutting operation, the teeth 21 produce a filleted portion 25 having the same radius as that of the teeth 21, hence no initial line of fracture is formed between the ring joint section and the body of the ring. In producing this joint section, the ring segment 18 is so mounted upon the work table 13 that when the ring section is completed the cut 24 is in a radial plane of the ring segment.

After the joint section 23 has been completed, as shown in Fig. 1, and the work has been retracted from the tool 19, the cutter 37 (Fig. 6) may be substituted for tool 19 and the table again advanced to bring the work against the cutter. The teeth 38 will then mill the rounded portion 26 on the joint section, as shown in Fig. 3.

The cutter 37, which will now be described in detail, comprises a body portion carrying a series of radial cutting teeth 38. The front faces of these teeth are cut back from the face 39 of the milling cutter at 40, and the portions 40 are inclined with respect to the plane of the front face 39 of the cutter to form a series of sharp cutting faces 42. The inclination is shown at 41, and it is to be understood that the cutting teeth 38 are complementary to those on cutter 19.

When the milling tool 19 is removed from the milling spindle and the cutter 37 is substituted therefor, the ring segment 18 is advanced toward the rotating cutter until the front corner of joint section 23 contacts with the cutting edges 42. These edges have the same curvature as the portion 23 of the ring joint, thereby rounding off the surface 26 as shown in Fig. 3. The amount of this rounding off may be controlled in suitable manner so that this surface 26 will interfit accurately with the filleted portion 35 of convex joint section 33, later to be described.

I will now describe the manner of producing the convex portion of the ring joint. By reference to Figs. 4 and 5, it will be seen that for this operation the work table 13 is provided with a block 27 upon which the work is secured by the clamps 16, as before. The first step of this operation is carried out by an inserted-tooth type of milling cutter comprising a hollow cup-shaped body or adapter 29 carried on milling spindle 28. The body 29 carries a plurality of evenly spaced inserted radial teeth 30 clamped in place by suitable clamps 31 and screws 32. It will further be noted that the teeth 30, as shown in detail in Fig. 11, have rounded portions 34 radiused to produce fillets between the convex joint section and the ring body.

In producing the convex ring section, the ring segment 18 is clamped on the block 27 and the table 13 rotated in a counter-clockwise direction into contact with the rotating cutter. The ring segment 18 is thereby brought into contact with the teeth 30 so as to produce a convex cut 33, as shown in Fig. 5. The direction of rotation of the milling cutter is indicated by the arrow in Fig. 5. The ring segment 18 may be mounted on the work table in such position that the curved ring section 33 has any predetermined radius and bears any desired relation to the radius of the ring proper. When the ring segment has been advanced toward the cutter as far as desired, it is retracted, thereby leaving a joint section as shown in Fig. 4, wherein the portion 35 between the ring body and the portion 33 is filleted.

In producing joints of this character, it has been found preferable to round off the face of joint sections 33, as shown at 36 in Fig. 8, so that this portion 36 may interfit with the filleted portion 25 of the concave joint section 23 when the joint is fully closed. The rounding off of this portion 36 may be carried out by the milling tool 29, after teeth 43 have been substituted for the teeth 30.

In Fig. 12, I have drawn a detail view of these teeth 43. The cutting faces of these teeth have a portion 44 of the same radius as the convex joint section 33, and these teeth are complementary to teeth 30. When the teeth 30 are inserted in the tool 29 they are clamped along the line Y—Y with the portions 34 projecting as shown in Fig. 11. In the case of the teeth 43, however, the projection is greater so that the front faces of the teeth cut away portion 36 and extend over convex portion 33 of the joint section. The rounded portion 36 produced in this way will fit into the fillet 25 of the concave section 23, to produce a tight joint.

When a ring joint has been made in this manner and a plurality of segments 18, each having concave and convex sections are assembled, a ring of the form shown in Fig. 10 is obtained. A ring of this character is capable of preventing blow-by as long as there is any substantial overlap of the joint sections, and consequently the life of rings having this particular type of joint is very much greater than that of rings having joints of types heretofore used.

I have shown and described my method of making joints in connection with segmental rings but it is obvious that this same method may be employed in making joints for heavy, large diameter, one-piece rings. This method is applicable to all rings having a diameter large enough to permit the joint to be sprung open, and the cutters to act upon one end of the ring without contacting with the other portions of the ring. It is to be understood, therefore, that my invention is not intended to be limited to the making of joints for segmental rings but is capable of general application, and that I do not intend it to be limited as to details except as such limitations are imposed by the terms of the claim.

What is claimed is:

The method of making a ring joint composed of complementary concave and convex sections which consists in bringing one end of a ring blank into contact with an end milling cutter to form a filleted concave joint section, milling away the free end of the section to produce a rounded portion, milling the other end of the blank to convex form by means of a milling cutter complementary to the first milling cutter, and then milling the convex section at its free end to produce a portion capable of interfitting with the filleted portion of the concave joint section.

In testimony whereof I have signed my name to this specification.

WILLIAM N. JUSTICE.